United States Patent
Pieterman

(10) Patent No.: US 8,153,921 B2
(45) Date of Patent: Apr. 10, 2012

(54) METHOD AND SYSTEM FOR REAL-TIME NON-DESTRUCTIVE TESTING OF PROJECTION WELDS UTILIZING FORCE SENSOR

(75) Inventor: Karel Pieterman, Amersfoort (NL)

(73) Assignee: AL-S Technology BV (NL)

( * ) Notice: Subject to any disclaimer, the term of this patent is extended or adjusted under 35 U.S.C. 154(b) by 1342 days.

(21) Appl. No.: 11/569,425

(22) PCT Filed: May 25, 2004

(86) PCT No.: PCT/EP2004/005752
§ 371 (c)(1),
(2), (4) Date: Nov. 20, 2006

(87) PCT Pub. No.: WO2005/115675
PCT Pub. Date: Dec. 8, 2005

(65) Prior Publication Data
US 2007/0228019 A1    Oct. 4, 2007

(51) Int. Cl.
*B23K 11/14* (2006.01)
(52) U.S. Cl. ......................... 219/93; 219/117.1
(58) Field of Classification Search ............... 219/93, 219/108, 109, 110, 117.1, 89, 91.1
See application file for complete search history.

(56) References Cited

U.S. PATENT DOCUMENTS

| | | | |
|---|---|---|---|
| 4,427,869 A | 1/1984 | Kimura et al. | 219/93 |
| 4,447,700 A * | 5/1984 | Cohen | 219/117.1 |
| 4,831,228 A * | 5/1989 | Schumacher | 219/86.22 |
| 5,225,647 A * | 7/1993 | Dufrenne | 219/109 |
| 5,683,598 A * | 11/1997 | Moro | 219/108 |
| 5,808,266 A * | 9/1998 | Cecil | 219/110 |
| 5,818,008 A | 10/1998 | Cecil | 219/110 |
| 6,054,668 A * | 4/2000 | Van Otteren et al. | 219/93 |
| RE37,607 E | 3/2002 | Cecil | |
| 6,455,801 B1 | 9/2002 | Bramervaer | 219/93 |

FOREIGN PATENT DOCUMENTS

| | | | |
|---|---|---|---|
| DE | 10060055 A1 * | 6/2002 | |
| GB | 1 343 875 | 1/1974 | |
| JP | 01154879 A * | 6/1989 | |
| JP | 06055275 A * | 3/1994 | |
| JP | 2000-61649 A * | 2/2000 | |
| JP | 2000218378 A * | 8/2000 | |
| JP | 2003-311427 A * | 11/2003 | |

OTHER PUBLICATIONS

Machine translation of Japan Patent document No. 2000-61,649, Feb. 2012.*

* cited by examiner

*Primary Examiner* — Geoffrey S Evans
(74) *Attorney, Agent, or Firm* — Hayes Soloway P.C.

(57) ABSTRACT

A method for manufacturing a projection weld connection between at least two parts of a workpiece, where the workpiece remains blemish free, comprising automated real-time verification of the quality of the individual weld, without use of destructive testing by analysis of data from a force sensor is disclosed. Measurements of the quality of each weld can be calculated, and real-time measurements and calculations can be used to verification of the structural integrity of the projection in the workpiece before the welding current is applied in order to avoid further damage to the workpiece. The method may be implemented in a system comprising, among other features, a displacement sensor.

22 Claims, 3 Drawing Sheets

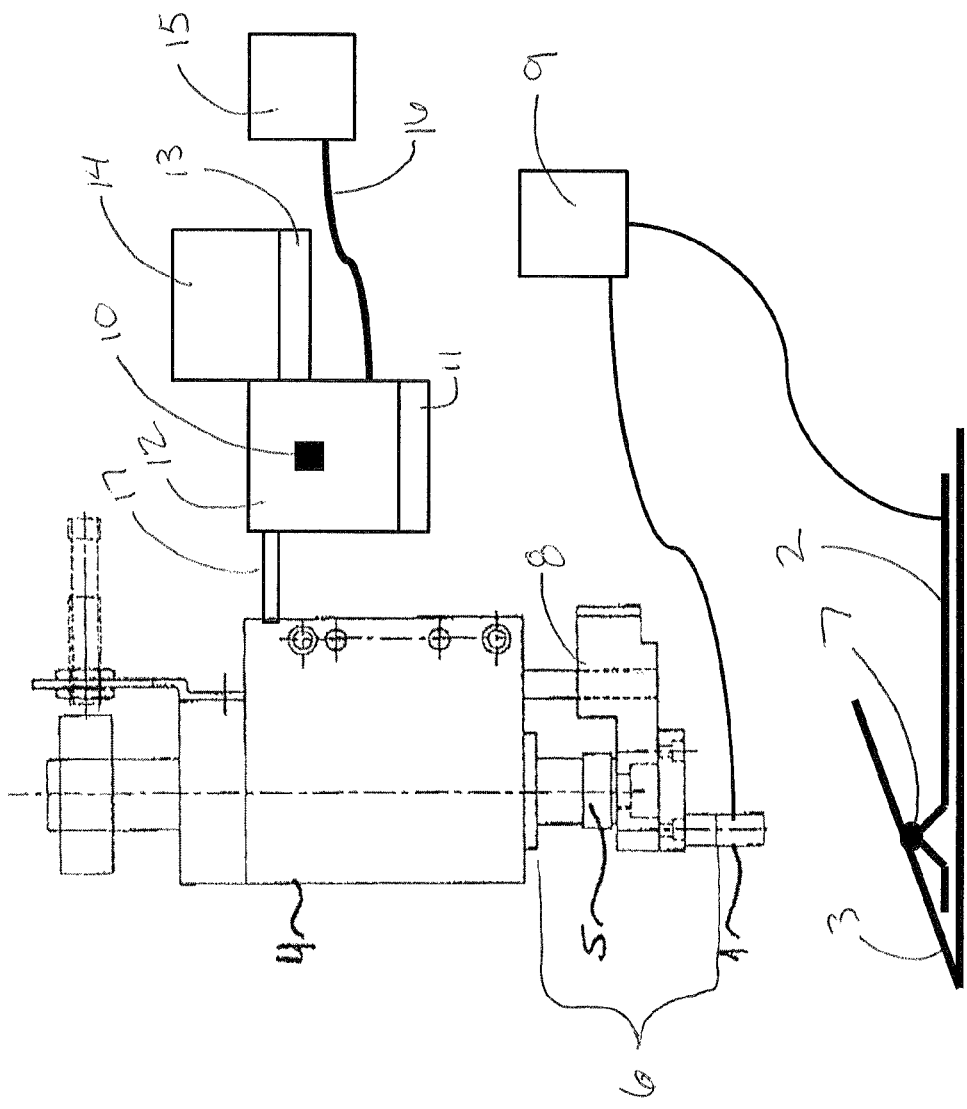

METHOD AND SYSTEM FOR REAL-TIME NON-DESTRUCTIVE TESTING OF PROJECTION WELDS UTILIZING FORCE SENSOR

The present invention generally relates to a method for manufacturing a projection weld connection between at least two parts of a workpiece, whereby said workpiece remains blemish free, characterised by the fact that said method comprises automated real-time verification of the quality of the individual weld, without the use of destructive testing, and the invention also relates to a system implementing the method.

The present invention concerns the well-known process of projection welding. In this process a first part of a workpiece, for instance a metal plate, has a protruding deformation that is generally referred to as 'projection'. If this part of the workpiece is to be welded to a second part of the workpiece, for instance also a metal plate, both parts are mechanically pressed together at the location of the projection and a pulse of current of short duration is applied at this same location. This causes the two parts to be welded together at the location of the projection.

A serious disadvantage of this type of welding process used to be the fact that the welding electrode leaves a visible imprint in the outer plate surface, that requires further finishing by for instance grinding. U.S. Pat. No. 6,455,801 provides a solution to this disadvantage and makes it possible to manufacture a projection weld and leave the parts to be welded blemish free. The present invention as described below, uses one of the methods known from prior art, for instance the method described in the aforementioned patent, that make it possible to manufacture a projection weld without leaving visible traces on the workpiece.

A further serious disadvantage of present methods for projection welding is the fact that, for instance in industrial welding, where many welds may be present in the same workpiece, it is very difficult to verify if an individual weld has been manufactured according to the required quality standards. Present systems known from prior art use current monitoring systems to determine the quality of projection welds produced. These systems only give a general indication of the average quality of a series of welds, but can not determine weld quality for an individual weld. Presently the only systems available that enable testing of weld quality of individual welds are highly sophisticated and costly measuring systems. Application of such systems is economically infeasible for most industrial applications of projection welding.

A third point of interest is the fact that the quality of a resulting weld in projection welding depends to a large extent on factors like the shape, dimensions and structural integrity of the projections. If these are flawed, for instance the height of a projection is not according to standards, the projection is not present at all or the projection has structural damage, the melting of the projection during the welding process does not take place in a controlled way which may result not only in an inadequate weld connection, but may also cause structural damage to the workpiece. In case of a flawed projection, no welding current should be applied to avoid further damage. For this, however, it is necessary to verify the dimensional and structural integrity of every projection, just before the welding current is applied. Systems presently known from prior art do not provide an adequate solution for this requirement.

The present invention aims to remedy the aforementioned disadvantages associated with the prior art. To achieve this a method for manufacturing a projection weld connection between at least two parts of a workpiece is proposed, whereby said workpiece remains blemish free, characterised by the fact that said method comprises automated real-time verification of the quality of the individual weld, without the use of destructive testing and without the need for costly sophisticated equipment.

A system implementing the method according to the present invention is also proposed.

A further advantageous aspect of the method according to the present invention, is the fact that a measure of the quality of every individual weld produced can be calculated automatically from real-time measurement of one or more parameters of the welding process.

The method for manufacturing a projection weld according to the present invention, is furthermore advantageously characterised by the fact that said method comprises automated verification of the structural integrity of the projection in the workpiece before the welding current is applied.

In addition to the aforementioned aspects of the method for manufacturing a projection weld according to the invention, the method is characterised by the fact that said method further comprises automated verification of the dimensional integrity of the projection in the workpiece before the welding current is applied.

The invention further proposes a system implementing the method of the present invention, whereby said system is characterized by the fact that it at least comprises:

a welding head suitable for projection welding;

positioning means to position said welding head on a first part of at least two parts of a workpiece, between which a projection weld has to be established;

drive mechanically connected to said welding head, enabling exercising such vertical force on said first part of said workpiece by means of the welding head, that said first part is pressed onto a second part of same workpiece. This drive may be of any suitable type, for instance pneumatic, hydraulic, electro motor and may be mechanically connected to the welding head by means of a driving shaft;

force sensor enabling measurement of the mechanical force that said welding head exercises on the workpiece;

displacement sensor enabling measurement of the vertical displacement of said welding head;

power transformer with low inductance which has one terminal of the secondary side electrically connected to the welding head and the other terminal electrically connected to the workpiece.

In a preferred embodiment of the system according to the invention the mechanical connection between said driving system and said welding head comprises at least one part that is made of a compressible material which exhibits a constant ratio between mechanical force applied to the material, and the resulting displacement. Such part of compressible material may be part of a driving shaft between a piston and the welding head.

Said force sensor in the system according to the present invention may advantageously be a piezo-electric force sensor.

A system implementing the method according to the present invention may furthermore advantageously be characterized by the fact that said system comprises electronic means that at least provide the following functionalities:

control of said drive to regulate the force that is exercised by said welding head on said workpiece. This can for instance be achieved by commonly available microcontrollers;

control of the welding current by switching on or off said power transformer;

measurement of the current through said secondary terminals of said power transformer;

read out, conversion and storage of the signals provided by said pressure sensor and said displacement sensor. Many of the commonly available sensors even comprise integrated electronic means that deliver the measurement values in digital form, which facilitates datacommunication, conversion and storage of the measurements;

storage of relevant data for each individual weld created;

data communication with external datacommunications or telecommunications equipment or networks;

input of data and control information by means of a keypad;

output of data and control information by means of a display. This may be for instance a Liquid Crystal Display (LCD) or a standard CRT monitor of suitable type.

The aforementioned electronic means of the system according to the present invention may advantageously comprise a microprocessor. Almost any standard microprocessor will nowadays be able to provide most of the aforementioned functionalities.

Because welding processes may be hazardous to the human health and because of the fact that many industrial welding processes are highly automated, some of said electronic means of the system according to the present invention may advantageously be located in a remote system unit that is connected to the rest of the system by means of an electric cable or by means of other suitable datacommunications or telecommunications means. This enables control of the system from, for instance, a central control room.

For some applications it may be advantageous that said remote system unit of the system according to the present invention is a hand-held terminal.

In the following a preferred embodiment of a system implementing the method according to the present invention will be described. The following description and the attached drawings will show to the reader in more detail how the invention remedies the aforementioned disadvantages associated with the prior art. However, the reader should observe that description and drawings are merely meant to illustrate application of the invention and should in no way be regarded as limiting the scope of the present invention.

FIG. 2 shows a partly cross-sectional view of a slightly modified embodiment of the system implementing the method according to the present invention;

Figure 1C:
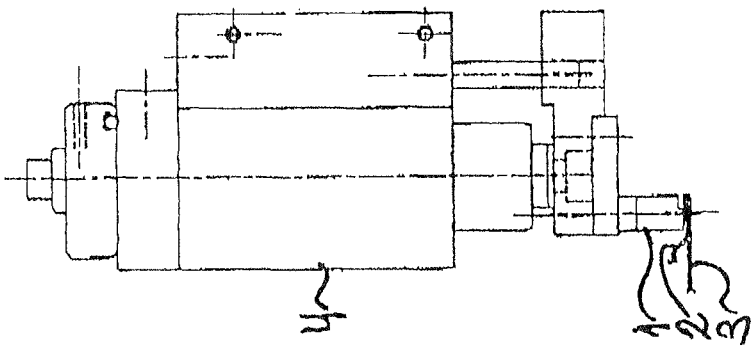
FIGS. 1A-1C show partly cross-sectional views of a specific embodiment of the system implementing the method according to the present invention.
Figure 1B:
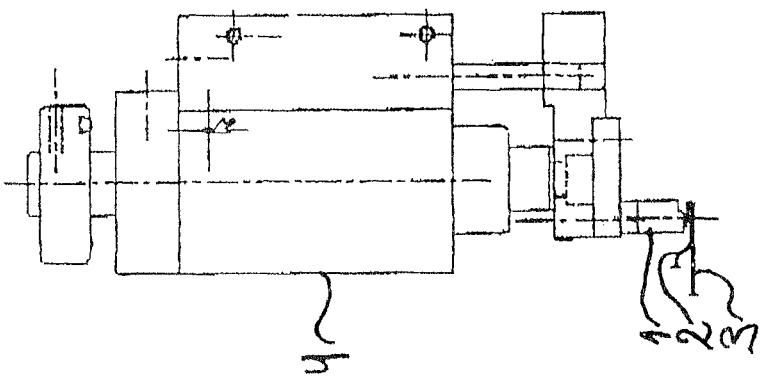
Figure 1A:
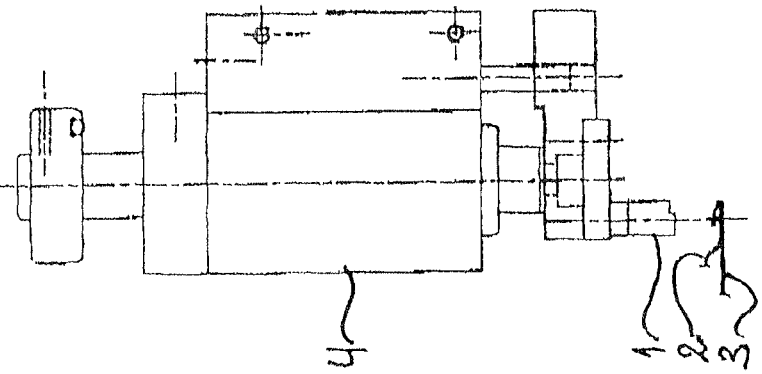

FIGS. 1A-1C, and 2 show a particular embodiment of a system implementing the method according to the present invention for manufacturing a projection weld (7) connection between at least two parts of a workpiece. In the FIGS. 1A-1C two plate material parts (2) and (3) of a workpiece are to be welded together using projection welding. The system comprises a welding head (1) that is suitable for projection welding. In this example we assume that the upper part (2) of the workpiece has an upwardly protruding deformation which shall hereafter be referred to as the 'projection'. This projection is located under welding head (1) where the dashed line through the welding head (1) intersects the plate material parts (2) and (3). The lower part (3) is furthermore folded back around the edge of the upper part (2) in such a way that the piece of plate material that is folded back, extends over the area where the projection is located. This particular configuration of the plate material parts (2) and (3) has been proposed in U.S. Pat. No. 6,455,801 as a method for manufacturing projection welds in plate material parts leaving the welded parts blemish free. In this example it is merely used to illustrate the general state of the art and shall in no way be regarded as limiting application of the present invention. The system implementing the method according to the present invention furthermore comprises drive (4) mechanically connected to welding head (1) and suitable to exercise such vertical force on the welding head that the plate material parts (2) and (3) and the folded-back part of part (3) are pressed together in the area where the projection is situated. In this example a piston drive is assumed, which is operated pneumatically. The system also comprises a power transformer (9) with low inductance which has one terminal of the secondary side electrically connected to the welding head, and the other terminal electrically connected to the workpiece. The mechanical connection (6) between the drive (4) and welding head (1) further comprises a part that is made of a compressible material which exhibits a constant ratio between mechanical force applied to the material, and the resulting displacement. The function of said compressible part is in this particular embodiment of a system implementing the method of the present invention performed by a mechanical spring located within drive (4). Now if this system would be used in standard projection welding, as shown in FIG. 2, the drive (4) would be operated to lower the welding head (1) onto the folded-back part of plate material part (3) and said folded-back part and the plate material parts (2) and (3) would be pressed together at the location of the projection. Then a pulse of current of short duration would be applied through the welding head (1) and the plate material parts (2) and (3) would be welded together at the location of the projection. As mentioned earlier standard projection welding methods and systems presently do not offer adequate and economically feasible solutions for reliable real-time testing of the weld quality of individual projection welds, which may have serious consequences like, for instance, inadequate weld connections or serious structural damage to the workpiece. To enable reliable testing of individual projection welds, the system implementing the method according to the present invention further comprises a force sensor (5) enabling measurement of the mechanical force that the welding head (1) exercises on the plate material parts (2) and (3) of the workpiece, and a displacement sensor (8) enabling measurement of the vertical displacement of said welding head. Said force sensor (5) may advantageously be a piezo-electric force sensor. FIG. 2 shows an embodiment of the system implementing the method of the present invention with a piezo-electric force sensor located in the mechanical connection between the drive (4) and the welding head (1). With the system implementing the method according to the present invention it is also possible to measure the current through the secondary terminals of the power transformer, which are electrically connected to the welding head (1) and the workpiece consisting of plate material parts (2) and (3) respectively. For the sake of clarity of this description the following assumption is made: to enable verification of the structural integrity of a projection, the average amount of pressure that the projection must be able to withstand when it is undamaged and structurally correct, is known before the welding current is applied.

In this particular embodiment of a system implementing the method according to the present invention the system is operated by means of a hand-held terminal (12), connected to the rest of the system by commonly known connection means and methods (17), and equipped with a microprocessor (10) and a suitable software program, a keyboard (13) and a liquid crystal (LCD) display (14). The hand-held terminal is furthermore equipped with commonly known electronic means enabling:

control of the drive (4) to regulate the force that is exercised by the welding head (1) on the workpiece;

control of the welding current by switching on or off said power transformer (9);

measurement of the current through said secondary terminals of said power transformer (9);

read out, conversion and storage (11) of the measurement signals provided by said piezo-electric force sensor (5) and said displacement sensor (8) storage of relevant data (11) for each individual weld created;

data communication (16) with external datacommunications or telecommunications equipment or networks (15).

Using the described embodiment of a system implementing the method of the invention, the process to manufacture a projection weld passes through the following stages:

the welding head (1) is positioned on the workpiece consisting of the two plate material parts (2) and (3), directly above the said projection in part (3);

a valve is opened and compressed air flows into the piston of drive (4) causing the welding head (1) to start exercising a mechanical force on the workpiece;

if a predetermined force has been reached and the displacement sensor (8) has not measured any unusual vertical displacement since the force was applied, it is assumed that the structural integrity of the projection is correct. If there would have been however unusual vertical displacement, it would be assumed that there, for instance, was no projection present in the plate material part (3) or that it collapsed prematurely. In this case the welding process is aborted to avoid structural damage to the workpiece caused by applying the welding current to a flawed projection;

an electronic power switch is activated and the welding current is applied;

during the usual melting and collapse of the projection causing the two parts of the workpiece to be welded together, the vertical force on the workpiece, the vertical displacement of the welding head (1) and the welding current are measured continuously and the measured values are stored in said hand-held terminal;

the microprocessor (10) in the hand-held terminal (12) processes the measurements and compares the resulting characteristics to average characteristics of projection welding processes that have resulted in adequate weld connections. If the characteristics match within certain boundaries, it is concluded that an adequate projection weld has been achieved and the process is repeated for the next weld.

Figure 3:
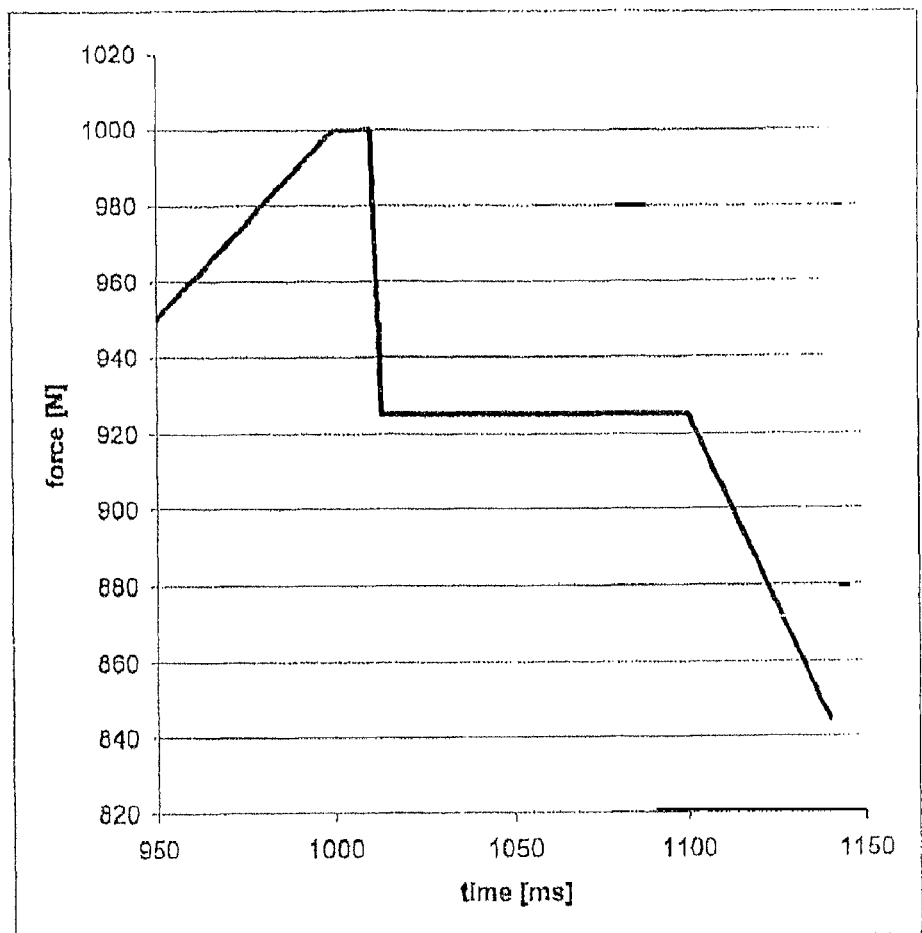
FIG. 3 shows a typical time-force curve which has resulted from measurements during manufacture of an adequate projection weld with the system implementing the method according to the present invention.

FIG. 3 shows a typical time-force curve which has resulted from measurements during manufacture of an adequate projection weld with the system implementing the method according to the present invention. It can be seen in the figure that the force is increased until a predetermined level has been reached from which can be concluded that the projection was structurally correct. Then the welding current is applied during a few milliseconds. It can be seen that the force decreases very rapidly when the projection melts and collapses. The welding current is switched off and a constant force remains to press the parts of the workpiece together until an adequate projection weld has been achieved.

The method according to the present invention for manufacturing a projection weld connection between at least two parts of a workpiece, and the system implementing said method offers a solution that enables reliable real-time testing of the quality of projection welds. This may avoid serious structural damage to the workpieces, and can provide valuable data to assure a permanent high quality of the projection welds in industrial welding processes, for instance by early detection of wear of stamps that are used to create projections in the material of parts that are to be welded together, so that maintenance can be scheduled efficiently. In addition to this it enables to store data concerning every single projection weld for later reference.

All parts of the described embodiment of the system implementing the method of the present invention are commonly available and can be manufactured by using commonly available materials and commonly known production methods.

The invention claimed is:

1. A method for manufacturing a projection weld connection between at least two parts of a workpiece having a projection, whereby the workpiece remains blemish free, wherein the method comprises the steps of:
contacting an electrode to the workpiece with an applied force by a welding head;
verifying the structural integrity of the projection, before a welding current is applied, by monitoring the applied force and displacement of the welding head;
applying a welding current through a welding head while continuously monitoring the applied force; and
determining whether the workpiece is correctly welded by comparing the monitored applied force to a predetermined value.

2. The method for manufacturing a projection weld according to claim 1, wherein the determination that the workpiece is correctly welded is automated.

3. The method for manufacturing a projection weld according to claim 2, wherein said method further comprises automated verification of a dimensional integrity of the projection in the workpiece before a welding current is applied.

4. The method for manufacturing a projection weld according to claim 3, wherein the electrode is displaced and the displacement of the electrode is measured.

5. The method of claim 1, further comprising the step of causing a reduction in the applied force to a steady level, after application of the welding current, to press the parts of the workpiece together until a desired projection weld has been achieved.

6. A system manufacturing a projection weld connection between at least two parts of a workpiece having a projection, wherein said system comprises:
a welding head suitable for projection welding;
a positioner to position said welding head on a first part of at least two parts of a workpiece, between which a projection weld is to be established, said workpiece having a projection;
a drive mechanically connected to said welding head, enabling exercising of a vertical force on said first part of said workpiece by the welding head, whereupon said first part is pressed onto a second part of the same workpiece;
a force sensor to measure a mechanical force that said welding head exercises on the workpiece;
a displacement sensor to measure displacement of said welding head;
a microprocessor that compares the measured mechanical force to a first predetermined standard and a measured amount of displacement of the welding head to determine the structural integrity of the projection before a welding current is applied, and compares the measured mechanical force to a second predetermined standard, during and after application of the welding current, to determine whether the workpiece is correctly welded; and a power transformer with low inductance which has one terminal of a secondary side electrically connected to the welding head and the other terminal electrically connected to the workpiece.

7. The system according to claim 6, wherein said force sensor comprises a piezo-electric force sensor.

8. The system according to claim 6, wherein said system further comprises electronics that at least provides the following functionalities:
control of said drive to regulate the mechanical force that is exercised by said welding head on said workpiece;
control of the welding current by switching on or off said power transformer;
measurement of the current through said secondary terminals of said power transformer;
read out, conversion and storage of the signals provided by said force sensor and said displacement sensor;
storage of relevant data for each individual weld created;
data communication with external datacommunications or telecommunications equipment or networks;
input of data and control information by a keypad;
output of data and control information by a display.

9. The system according to claim 8, wherein some of said electronics are located in a remote system unit that is connected to the rest of the system by an electric cable or by datacommunications or telecommunications.

10. The system according to claim 9, wherein said remote system unit is a hand-held terminal.

11. The system according to claim 6, wherein the mechanical connection between said drive and said welding head comprises at least one part that is made of a compressible material which exhibits a constant ratio between mechanical force applied to the compressible material, and a resulting displacement.

12. The system for manufacturing a projection weld according to claim 6, wherein said system further comprises a displacement sensor for measuring a displacement of said welding head.

13. A method for measuring the quality of an individual weld connection between at least two parts of a workpiece having a projection in an automated weld process comprising the steps of:
contacting an electrode to the workpiece with an applied force by a welding head;
verifying the structural integrity of the projection, before a welding current is applied, by monitoring the applied force and displacement of the welding head;
applying a welding current through a welding head while continuously monitoring the applied force; and
determining whether the workpiece is correctly welded by comparing the monitored applied force to a predetermined value.

14. The method for manufacturing a projection weld according to claim 13, wherein the determination that the workpiece is correctly welded is automated.

15. The method for manufacturing a projection weld according to claim 14, wherein said method further comprises automated verification of a dimensional integrity of the projection in the workpiece before a welding current is applied.

16. The method of claim 13, further comprising the step of causing a reduction in the applied force to a steady level, after application of the welding current, to press the parts of the workpiece together until a desired projection weld has been achieved.

17. A system manufacturing a projection weld connection between at least two parts of a workpiece having a projection wherein said system comprises:
a welding head suitable for projection welding;
positioner to position said welding head on a first part of at least two parts of a workpiece, between which a projection weld is to be established, said workpiece having a projection;
a drive mechanically connected to said welding head, enabling exercising of a vertical force on said first part of said workpiece by the welding head, whereupon said first part is pressed onto a second part of the same workpiece;
a force sensor to measure a mechanical force that said welding head exercises on the workpiece;
a displacement sensor to measure displacement of said welding head;
a microprocessor that compares the measured mechanical force to a first predetermined standard and a measured amount of displacement of the welding head to determine the structural integrity of the projection before a welding current is applied, and compares the measured mechanical force to a second predetermined standard, during and after application of the welding current, to determine whether the workpiece is correctly welded; and
a power transformer with low inductance which has one terminal of a secondary side electrically connected to the welding head and the other terminal electrically connected to the workpiece.

18. The system according to claim 17, wherein the mechanical connection between said drive system and said welding head comprises at least one part that is made of a compressible material which exhibits a constant ratio between mechanical force applied to the compressible material, and a resulting displacement.

19. The system according to claim 17, wherein said force sensor comprises a piezo-electric force sensor.

20. The system according to claim 19, wherein some of said electronics are located in a remote system unit that is connected to the rest of the system by an electric cable or by datacommunications or telecommunications.

21. The system according to claim 20, wherein said remote system unit is a hand-held terminal.

22. The system according to claim 17, wherein said system further comprises electronics that at least provides the following functionalities:
control of said drive to regulate the mechanical force that is exercised by said welding head on said workpiece;
control of the welding current by switching on or off said power transformer;
measurement of the current through said secondary terminals of said power transformer;
read out, conversion and storage of the signals provided by said force sensor and said displacement sensor;
storage of relevant data for each individual weld created;
data communication with external datacommunications or telecommunications equipment or networks;
input of data and control information by a keypad;
output of data and control information by a display.

* * * * *